United States Patent [19]

Boudreaux et al.

[11] Patent Number: 4,847,097

[45] Date of Patent: * Jul. 11, 1989

[54] METHOD FOR RAPIDLY DEVELOPING A RED COLOR IN MEAT USING STREPTOCOCCUS LACTIS SUBSPECIES DIACETYLACTIS

[75] Inventors: Donald P. Boudreaux; Mark A. Matrozza, both of Sarasota, Fla.

[73] Assignee: Microlife Technics, Inc., Sarasota, Fla.

[*] Notice: The portion of the term of this patent subsequent to Mar. 1, 2005 has been disclaimed.

[21] Appl. No.: 49,934

[22] Filed: May 15, 1987

[51] Int. Cl.$^4$ ................................................ A23L 1/31
[52] U.S. Cl. ........................................ 426/56; 426/59; 426/61; 426/262; 426/332
[58] Field of Search ............... 426/56, 59, 61, 262, 426/332, 55, 58, 265, 266, 268, 260, 331, 531–532, 641, 644, 646, 647, 604, 7; 435/253, 42, 68, 69, 139, 859, 822, 885

[56] References Cited

U.S. PATENT DOCUMENTS

| | | |
|---|---|---|
| 3,814,817 | 6/1974 | Everson et al. . |
| 4,013,797 | 3/1977 | Gryczka . |
| 4,147,807 | 4/1979 | Gryczka et al. . |
| 4,304,868 | 12/1981 | Gryczka et al. . |
| 4,477,471 | 10/1984 | Gonzalez . |
| 4,728,518 | 3/1988 | Gonzalez et al. ...................... 426/56 |

OTHER PUBLICATIONS

Reddy, et al., J. Food Science 35: 781–791 (1970).

Primary Examiner—Marianne Cintins
Attorney, Agent, or Firm—Ian C. McLeod

[57] ABSTRACT

A method for rapidly developing a red color in fermented meat using *Streptococcus lactis* subspecies *diacetylactis* is described. The method allows the red color to rapidly develop at a pH above about 5.3 for at least 10 hours and then optionally a faster lactic acid producing bacteria lowers the pH to below about 4.9. The result is a fermented meat with an appealing red color which rapidly develops during processing.

6 Claims, No Drawings

METHOD FOR RAPIDLY DEVELOPING A RED COLOR IN MEAT USING STREPTOCOCCUS LACTIS SUBSPECIES DIACETYLACTIS

BACKGROUND OF THE INVENTION

(1) Summary of the Invention

The present invention relates to a method using *Streptococcus lactis* subspecies *diacetylactis* to rapidly develop a red color in a meat formulation containing a food grade nitrite and an assimilable sugar. In particular the present invention relates to a method wherein the *Streptococcus lactis* subspecies *diacetylactis* rapidly develops the red color in the meat at a pH above about 5.3 and then the pH further decreases to about 4.9. Faster lactic acid producing bacteria can be used to more rapidly reduce the pH to below 5.3.

(2) Prior Art

The prior art relating to the fermenting of meat is extensive; however, it is believed to be unknown that *Streptococcus lactis* subspecies *diacetylactis* can develop a red color in a fermented meat. This species is not used in commercial meat fermentations. It is generally referred to in U.S. Pat. No. 3,814,817 to Everson et al; however, the red color development by *Streptococcus lactis* subspecies *diacetylactis* was not disclosed. It is believed that the reason that the red color development was not observed is that the pH development of *Lactobacillus plantarum* NRRL-B-5461 is so rapid that the *Streptococcus lactis* subspecies *diacetylactis* did not have time to develop the red color.

Reddy et al, J. Food Science 35 787-791 (1970) a discuss the use of Streptococcus in raw meat. Ascorbic acid had to be used to maintain the fresh color of the meat.

U.S. Pat. No. 4,477,471 to Gonzalez describes *Streptococcus lactis* subspecies diacetylactis NRRL-B-15006. The strain was disclosed for use in milk fermentations and not for meat fermentations. This strain has been engineered to eliminate lactose fermentation.

GENERAL DESCRIPTION

The present invention relates to an improvement in a method for curing and fermenting meat by inoculating the meat containing a food grade nitrite and an assimilable sugar with a lactic acid producing bacterium and fermenting the meat to reduce the pH of the meat which comprises: inoculating the meat with a sufficient number of cells of a *Streptococcus lactis* subspecies *diacetylactis* alone or in admixture with another faster lactic acid producing bacterium so as to maintain the pH above about 5.3 for a period of at least 10 hours at a temperature between about 20° and 40° C. so that the meat rapidly develops a cured red color during the period; and fermenting the meat to reduce the pH to less than 5.3 after the period. The *Streptococcus lactis* subspecies *diacetylactis* will lower the pH to about 4.9 or above which is preferred. A faster lactic acid producing bacteria can lower the pH to about 4.9 more rapidly and allow the pH to drop to below about 4.5.

The pH of the meat formulation needs to remain above 5.3 for a period of time to prevent inhibition of *Streptococcus lactis* subspecies *diacetylactis* and to allow the rapid color development. This result is achieved by proper choice of fermentation temperature and, if used, the cell count of the faster lactic acid producing bacterium.

SPECIFIC DESCRIPTION

EXAMPLE 1

The meat formulation used in this Example was by weight as follows:
Pork (fat adjusted to 28% by weight)
Sodium chloride (salt)—3.3%
Dextrose—1.0%
BHA—0.003%
BHT—0.003%
Citric Acid—0.003%
Sodium nitrite—220 ppm
No spices The initial pH of the formulation was about 6.0. BHT and BHA prevent rancidity. Dextrose is the assimilable sugar which develops lactic acid. Sodium nitrite inhibits spoilage and contributes to color development. Citric acid accelerates color development by potentiating the affect of the sodium nitrite. Salt (sodium chloride) is a flavoring and preservative.

The time required above pH 5.3 to achieve a good red color as a function of various incubation temperatures is set forth in Table I:

TABLE I

| Time Required For Development of 3 to 4+ Color Using *Streptococcus lactis* subspecies *diacetylactis* NRRL-B-15006 alone at Various Temperatures[a] | |
|---|---|
| Incubation Temp. | Hours for 3 to 4+ Color (Ave. 3 Tests) |
| 24° C. | 21.3 |
| 27° C. | 18.0 |
| 30° C. | 15.0 |
| 33° C. | 12.0 |
| 36° C. | 10.0 |

[a]The cell count was $2 \times 10^7$ cells per gram of the meat formulation.

It was found that the optimum incubation temperature in the meat formulation for *Streptococcus lactis* subspecies *diacetylactis* NRRL-B-15006 was 33° to 35° C. with the relative humidity at greater than 90%. Thus the pH of the fermentation should remain above pH 5.3 for 12 to 10 hours, respectively, for significant color development at these optimum temperatures and longer at the lower temperatures.

EXAMPLE 2

Meat fermentations were conducted in a standard salami formulation. Comminuted pork was supplemented with 1% dextrose, 3.3% sodium chloride, 0.56% spice mix, 156 ppm sodium nitrite, 0.003% each of BHA and BHT and 0.003% of citric acid all by weight. The blend was mixed thoroughly and *Streptococcus lactis* subspecies *diacetylactis* NRRL-B-15006 was added at a rate of $2.0 \times 10^7$ CFU/g of meat.

The inoculated meat was stuffed into 35 mm casings and incubated at 10° C. for 24 hours and then transferred to 22.2° C. (relative humidity=80%). After 24 hours at 22.2° C. the product had developed a red color. The pH was 5.64. The product was further incubated at 22.2° C. (70% relative humidity) for 14 days at which time the pH was about 4.9. Throughout processing, the intensity of the red color obtained using *S. lactis* subspecies *diacetylactis* was superior to that obtained in control salami prepared using a commercial starter culture. The *Streptococcus lactis* subspecies *diacetylactis* product had an excellent clean acid flavor providing no secondary flavor contribution to the product.

EXAMPLE 3

This example shows a dried sausage. Meat fermentations were conducted in a standard salami formulation. Comminuted pork was supplemented with 1% dextrose, 3.3% sodium chloride, 0.56% spice mix, 156 ppm sodium nitrite, 0.003% each of BHA and BHT and 0.003% of citric acid all by weight. The blend was mixed thoroughly and *Streptococcus lactis* subspecies *diacetylactis* NRRL-B-15006 was added at a rate of $2.0 \times 10^7$ CFU/g of meat.

The inoculated meat was stuffed into 60 mm diameter casing and incubated at 22.2° C. (relative humidity of 80%). The pH after 24 hours was about 5.60 and the product had developed a bright red color. The product was further incubated for 24 to 48 hours to a final pH of 5.0 to 5.2. The product was then transferred to a drying room (22.2° C./72% relative humidity) for 40 to 50 days. The finished product had a final pH of 4.9 to 5.2, an excellent cured red color and a clean acid flavor providing no secondary flavor contribution to the product.

EXAMPLE 4

*Streptocccus lactis* subspecies *diacetylactis* (NRRL-B-15006) can be used alone for fermentation of the meat formulation as shown by Examples 1 to 3, but for a more rapid commercial fermentation, *Streptococcus lactis* subspecies *diacetylactis* is used in conjunction with a more active (faster) lactic acid producing bacterium.

At 33° to 36° C., *Pediococcus acidilacticii* NRRL-B-5627, which is a commercially available strain, was used at $8.2 \times 10^6$ cells per gram of the meat formulation of Example 1. These relatively low cell counts allow sufficient time at above pH 5.3 for significant red color development by the *Streptococcus lactis* subspecies *diacetylactis*. *Streptococcus lactis* subspecies *diacetylactis* NRRL-B-15006 was used at $2 \times 10^7$ cells per gram of the meat formulation. The results are shown in Table II.

TABLE II

| Pediococcus acidilactici NRRL-B-5627 and NRRL-B-15006 | | | |
|---|---|---|---|
| Hours at 35° C. | pH | With S. diacetylactis Color | Without S. diacetylactis Color |
| 0 | 6.10 | 0+ | 0+ |
| 12.5 | 5.47 | 3+ | 0+ |
| 13.5 | 5.42 | 3+ | 1+ |
| 14.5 | 5.20 | 3+ | 2+ |
| 16.0 | 5.08 | 3+ | 2+ |
| 18.0 | 4.96 | 3+ | 3+ |

0+ = no color, brown/gray
3+ = excellent red color
4+ = intense red/cured color

As can be seen from Table II, the color development is much faster with the *Streptococcus lactis* subspecies *diacetylactis* NRRL-B-15006. Samples of this meat formulation which contained only *Streptococcus lactis* subspecies *diacetylactis* at $2 \times 10^7$ CFU/g meat reached a pH of 5.15 in 23 hours. The pH is reduced in a much shorter period of time using the *Pediococcus acidilactici*.

EXAMPLE 5

Some processors use sodium nitrate rather than sodium nitrite in the cure. To develop cured red color in a meat formulation containing sodium nitrate, a nitrate reducing bacterium is required.

Meat fermentations were conducted in a standard salami formulation. Comminuted pork was supplemented with 1% dextrose, 3.3% sodium chloride, 0.56% spice mix, 200 ppm sodium nitrate, 0.003% each of BHA and BHT and 0.003% of citric acid all by weight. The blend was mixed thoroughly and *Streptococcus lactis* subspecies *diacetylactis* (NRRL-B-15006) was added at a rate of $3.0 \times 10^7$ CFU/g of meat and *Micrococcus varians* (NRRL-B-18051) was added at a rate of $1 \times 10^7$ CFU/g of meat.

The inoculated meat was stuffed into 60 mm diameter casing and incubated at 22.2° C. (relative humidity of 80%). The pH after 24 hours was about 5.24 and the product had developed a bright red color. Control samples that contained no culture or no nitrate reducing culture retained the brown color of the original meat formulation.

This Example shows that a food grade nitrate can be reduced to a nitrite by a nitrate reducing bacteria. Such bacteria are well known and are disclosed in U.S. Pat. Nos. 4,147,807 and 4,304,868 to Gryczka et al and 4,013,797 to Gryczka.

At these temperatures the results of Examples 1 to 5 are achieved with other strains of *Streptococcus lactis* subspecies *diacetylactis* such as ATCC 15346 alone or in combination with faster lactic acid producing bacteria. The *Streptococcus lactis* subspecies *diacetylactis* are introduced into the meat formulation along with additional cells of a fast lactic acid producing bacterium in a preferred ratio by cell count of between 1 to 1 and 1 to 2.5 of faster lactic acid producing bacterium to *Streptococcus lactis* subspecies *diacetylactis*. A total cell count in the meat formulation between about $10^5$ and $10^7$ of each species is preferred. Preferably the fermentation is conducted at between 20° C. and 40° C. Preferably the relative humidity is greater than 80%.

It is intended that the foregoing description be only illustrative of the present invention and that the invention be limited only by the hereinafter appended claims.

We claim:

1. In a method for curing and fermenting meat by inoculating meat containing a food grade nitrite and an assimilable sugar with a lactic acid producing bacterium and fermenting the meat to reduce the pH of the meat the improvement which comprises:
   (a) inoculating the meat with a sufficient number of cells of a *Streptococcus lactis* subspecies *diacetylactis* alone or in admixture with another lactic acid producing bacterium so as to maintain the pH above about 5.3 for a period of at least 10 hours at a temperature between about 20° and 40° C. so that the meat rapidly develops a cured red color during the period; and
   (b) fermenting the meat to reduce the pH to less than 5.3 after the period of at least 10 hours.

2. The method of claim 1 wherein the *Streptococcus lactis* subspecies *diacetylactis* is ATCC 15346.

3. The method of claim 1 wherein the *Streptococcus lactis* subspecies *diacetylactis* is NRRL-B-15006.

4. The method of claim 1 wherein the fermentation is conducted at a humidity greater than 80 percent.

5. The method of claim 1 wherein the lactic acid producing bacterium and *Streptococcus lactis* subspecies *diacetylactis* are introduced into the meat together in step (a).

6. The method of claim 5 wherein the ratio of the cells of lactic acid producing bacterium to *Streptococcus lactis* subspecies *diacetylactis* introduced into the meat is between about 1 to 1 and 1 to 2.5, and wherein the number of cells of *Streptococcus lactis* subspecies *diacetylactis* introduced into the meat between about $10^5$ and $10^7$ cells per gram of meat.

* * * * *